United States Patent [19]

Evans, II

[11] Patent Number: 4,756,118

[45] Date of Patent: Jul. 12, 1988

[54] METHOD AND APPARATUS FOR THE DESTRUCTION OF IMPORTED FIRE ANTS OF THE GENUS SOLENOPSIS

[76] Inventor: Charles W. Evans, II, 575 20th St., Beaumont, Tex. 77706

[21] Appl. No.: 901,589

[22] Filed: Aug. 29, 1986

[51] Int. Cl.$^4$ .............................................. A01M 7/00
[52] U.S. Cl. ..................................... 43/132.1; 43/124
[58] Field of Search ............. 43/124, 125, 129, 132.1, 43/144

[56] References Cited

U.S. PATENT DOCUMENTS

| | | | |
|---|---|---|---|
| 1,529,785 | 3/1925 | Hammond et al. | 43/125 |
| 1,614,015 | 1/1927 | Neuls | 43/125 |
| 1,930,588 | 10/1933 | Dibble | 43/127 |
| 3,782,026 | 1/1974 | Bridges et al. | 43/124 |
| 4,160,336 | 7/1979 | Query et al. | 43/132.1 |

*Primary Examiner*—M. Jordan

[57] ABSTRACT

Method and apparatus for the mechanical destruction of members of the genus Solenopsis, the South American Fire Ant, by the introduction of intense heat, vapor, insecticides, and/or steam directly into the colony by incorporating the use and application of specific compounds and mixtures of hydrocarbons, pyrethroids, insecticides, oxidizing agents, and/or vaporizing liquids, injected into the individual ant colonies by a variety of methods, including a pressurizing injection gun, with or without a heating attachment. The device is designed to obtain the proper penetration of the Imported Fire Ant colony in order to rapidly and totally infuse the entire chamber area, as well as the lateral foraging tunnels, with a thermal vapor (fog) containing an insecticide known to be lethal to Formicoidea (ants). Additionally, upon cooling, the vapor recondenses into a residue that has a prolonged residual killing effect for continued control purposes. An additional effect of this system is that the mere contact of the superheated vapor is lethal to those ants in the immediate vicinity of the lance so that the system is not totally dependent on insecticidal properties of the active ingredients.

14 Claims, 2 Drawing Sheets

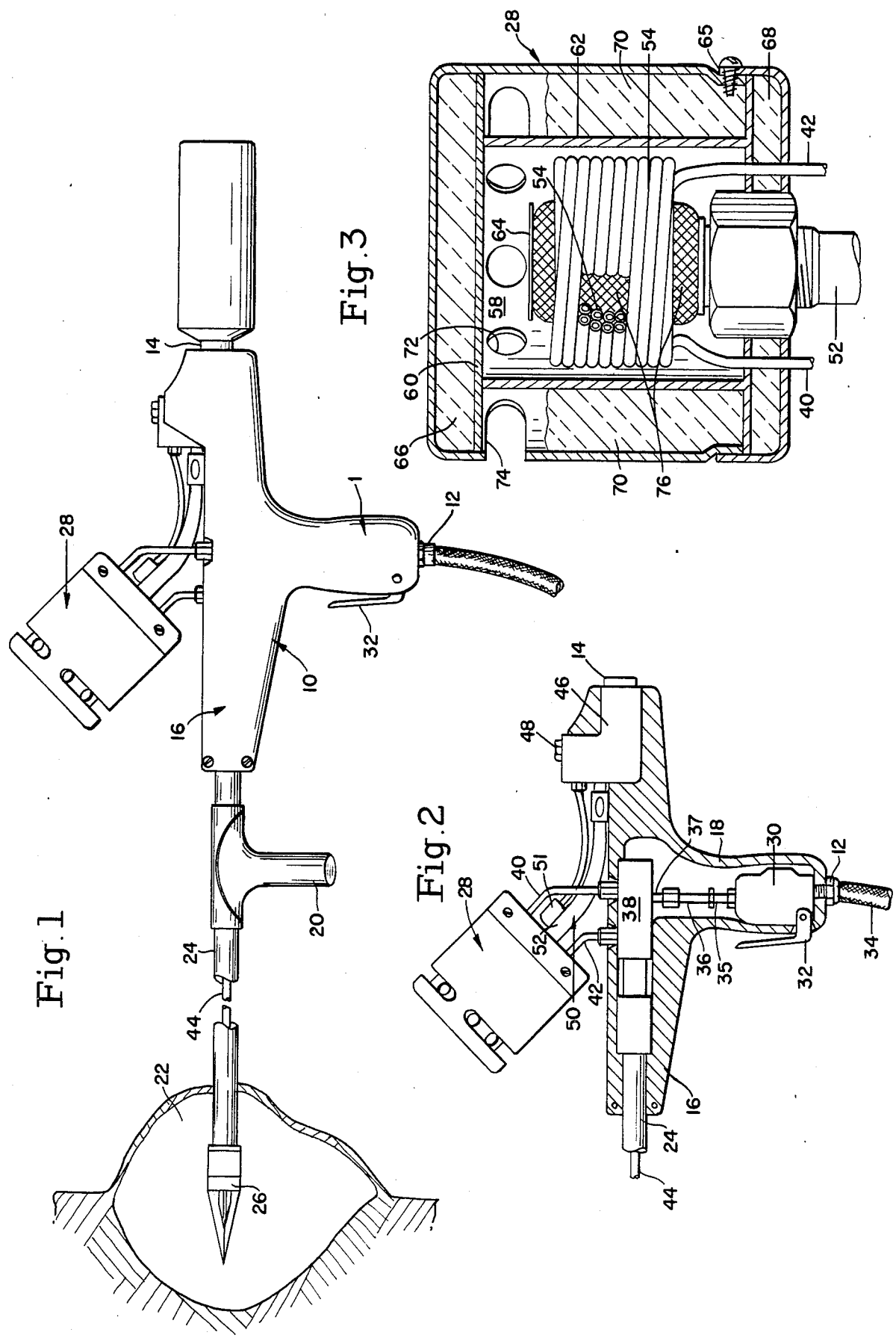

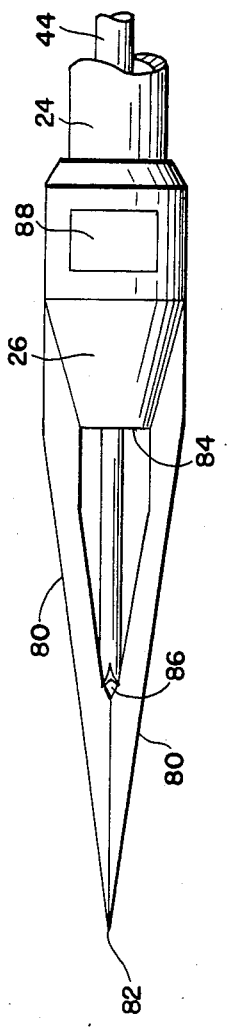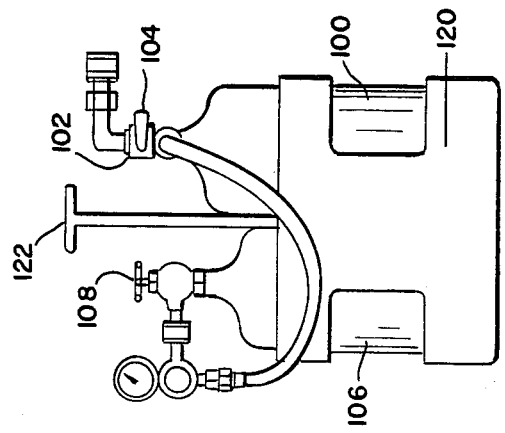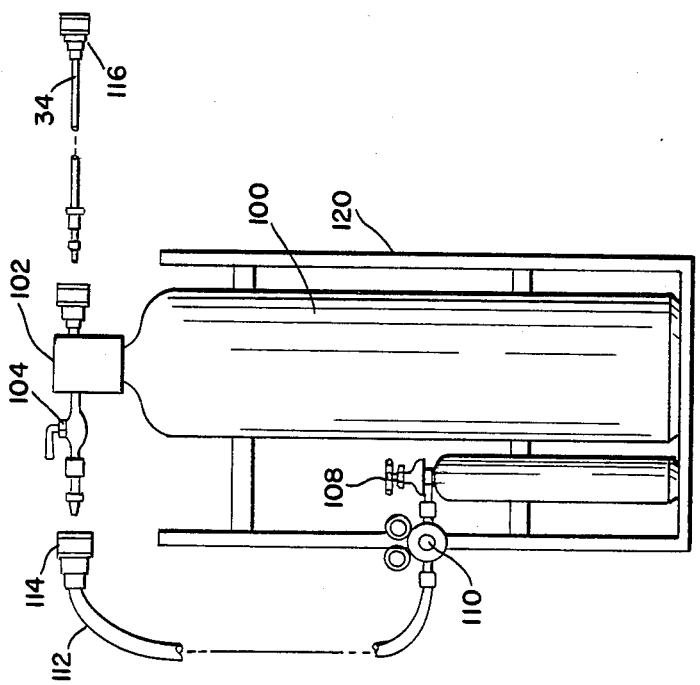

METHOD AND APPARATUS FOR THE DESTRUCTION OF IMPORTED FIRE ANTS OF THE GENUS SOLENOPSIS

BACKGROUND OF THE INVENTION

The present invention relates to the treatment of Imported Fire Ants. In particular, the present invention relates to a method and an apparatus for the eradication of Imported Fire Ants.

Since the introduction of *Solenopsis saevissima* into the United States at Mobile, Ala., in 1918, several other species of the South American ant, of the Genus Solenopsis, have subsequently been brought into the country. For example, *Solenopsis invicta* came in from Argentina or Bolivia in about 1930. This species, being the most voracious of the genus, drove out and killed the *Solenopsis geminata* and *Solenopsis saevissima*. *Solenopsis invicta* is known to kill and eat chickens, calves, and piglets. They also store grain, such as soybeans, as well as the remains of their animal victims. They are known to consume an average of six to eight bushels of soybeans per acre in those fields with normal infestation. They attack any living thing that invades their established territory surrounding their nesting mounds. For example, in 1979, one Georgia country hospial treated some 28,500 human ant sting victims in this one year alone. Solenopsis has also killed or driven out of their territories countless numbers of helpful species of insects, particularly other beneficial or harmless ant species. Of the five recognized species of fire ants in the United States, *Solenopsis invicta*, the Red Imported Fire Ant, and *Solenopsis richteri*, the Black Imported Fire Ant, are the two most economically important.

To date, more than 300 million acres of crop land, pasture land, school grounds, lawns, recreation areas, etc., throughout the entire southern portion of the United States and Puerto Rico have been infested by the Imported Fire Ant, with many millions of acres rendered useless. According to United States Department of Agriculture estimates, Solenopsis is continuing to spread outward at the rate of about thirty (30) miles per year, is expected to eventually extend as far north as New York, and to completely cover the Pacific coast states.

The United States Department of Agriculture also estimates an annual yearly loss to agriculture of several billions of dollars. For example, in 1981, the loss of soybeans in Texas alone amounted to some $485 million. In Florida the annual loss of soybeans amounts to $245 million at this time. In 1986, the United States Department of Agriculture presented data showing the economic impact of the Imported Fire Ant on the Florida citrus industry to be as follows: (1) replacement of Navel Orange trees, $77.00 per acre; (2) replacement of Hamlin Orange trees, $146.20 per acre; and (3) replacement of Grapefruit trees, $207.20 per acre. Additionally, it is estimated that the loss of potato crops in Florida alone is some 36% of the total crop. Of course, other states will have similar statistics.

The current state of the art of Imported Fire Ant control is basically the same as it has been from the beginning, i.e., chemical control; with the majority of the poison baits used being supplied by and/or subsidized by the government. The most effective chemical control agent was Mirex, dodecachlorooocta-hydro-1,3,4-metheno-2H-cyclobuta(cd)pentalene. However, Mirex is a proven carcinogenic agent and has an Acute Oral $LD_{50}$ of 306 mg./kg. Mirex was banned by the Federal Government in 1978.

Currently, the government is approving for use American Cyanamid Company's Amdro, tetrahydro-5,5,-dimethyl-2(1-H)-pyrimidinone[3-[4-(trifluoromethyl)phenyl]-1-[2-[4-trifluoromethyl]phenyl]ethenyl]-2-propenyl-idene]hydrazone, which is another amidinohydrazone of the organo-fluorine group. Amdro is very limited in its effectiveness and its use, since it can only be applied when climatic conditions are extremely favorable. The primary problem with all poison baits is the fact that they are indiscriminate killers and have eliminated useful and helpful insects, including ants, where they are used. It has become the general consensus of opinion of the recognized experts in the field of Imported Fire Ant control that the broadcast applications of nonspecific formicides has actually led to an increase in the population of the fire ants by the elimination of those species of ants and other insects which helped to keep the population of the Imported Fire Ant under control.

Drench compounds and techniques are also limited by climatic conditions, require transporting as much as five (5) gallons of water as a diluent to the individual mounds, and are of limited success due to the slow percolation of the drench material which allows many colony members, including gravid queens, to escape and to reestablish new colonies elsewhere. Juvenile Growth Hormone compounds and techniques are currently being developed, as well as biological control agents, but again, these two methods have a very limited use potential for the same basic reasons as stated above.

With respect to the state of the art of Imported Fire Ant control, U.S. Pat. No. 4,160,336, issued to Query, et al, July 10, 1979, pertains to an apparatus for treating fire ants wherein a refrigerant and an insecticide, pyrethrum, is mixed and injected as an aerosol into the individual mounds. In that treatment, Pyrethrum is injected into a Fire Ant nest along with a refrigerant. Alternatively, any other desired quick-kill, non-residual insecticide may be utilized according the Query patent.

Pyrethrum is a pyrethrin, a botanical insecticide, the active constituents of which are pyrethrins I and II (esters of pyrethrolone, chrysanthemic acid, and pyrethroic acid), and jasmolin I and II (jasmoline, chrysanthemic acid, and pyrethroic acid) collectively known as "pyrethrins". The plant *Chrysanthemum cinerariaefolium* and its flowers are the source of the constituents. The flowers and the extracts therefrom are principally imported from Kenya, Africa, and Ecuador, South America.

Another patent, U.S. Pat. No. 3,229,409, issued to H. D. Johnson, et al, Jan. 18, 1966, relates to hand held aerosl dispensers of insecticides. It is self evident that, although these two patents relate to the same general field of technology, the present invention is unique in its application method, and the apparatus designed to produce the desired results.

The Imported Fire Ant builds nest mounds that are some thirty (30) inches in diameter, some twenty-four (24) inches high above the ground, and extending an average of six (6) feet beneath the surface, but often extending as much as twenty (20) feet deep. They construct lateral foraging tunnels a few inches beneath the ground's surface which extend outward for an average of seventy-five (75) feet. The colonies can contain some 250-300 thousand individual ants and in areas of average infestation, the colonies number fifty (50) per acre. It is known that as many as 97 thousand new queens are produced per acre, per year, on the average. The typical life span of an egg laying queen and the colony is three to five years.

When a colony is disturbed in any manner, such as the vibration or pressure changes caused by approaching footsteps or the vibration of pouring a drench or granual bait on the mound, the entire colony can be totally evacuated in less than one minute. At the time of the first vibration, the workers immediately lead the queens deep into the central reaches of the nest or out through the various lateral tunnels and thus to safety from most attempts to kill the queens. A single, surviving queen is capable of re-establishing a colony.

Accordingly, it will be apparent that a need continues to exist for a means of treating, with the goal or eradicating, the Imported Fire Ant of the genus Solenopsis.

OBJECTS AND SUMMARY OF THE INVENTION

From all of the evidence to date, it is clear that it is necessary to completely destroy, individually, each Imported Fire Ant colony; otherwise, survivors, secondary and surviving queens, larval forms, and eggs remain viable and can continue to reproduce, migrate, and again re-infest the treated area.

The usefulness of the following described invention and process is evidenced by the fact that it is: (1) species specific; (2) provides instantaneous infusion of the entire colony by lethal vapor which destroys all of the colony's queens, all of the eggs, as well as all of the adults, juveniles, and all larval stages thus preventing reinfestation by migration or re-habitation and is, thereby, a one time use control agent; (3) is not subject to use in specific climatic conditions; and (4) has no deleterious after effects to the area treated.

Accordingly, it is the object of the present invention to provide a new, innovative method for the control and eradication of the Imported Fire Ant in situ.

Furthermore, it is an object of the present invention to provide an apparatus to accomplish the above described results.

A unique feature of the method is that the entire colony, including lateral tunnels, is so rapidly filled with insecticidal thermal vapor of such small particulate size, through a single injection site, that escape by colony members before being touched by the vapor is not possible.

Another unique feature of the preferred insecticide used in the method is evidenced by the fact that the Environmental Protection Agency requires a new registry of a new product and a new use pattern. This means that there is no other registered use pattern the same as described herein, existing for this preferred chemical, resmethrin.

A unique feature of the apparatus is that the chemicals and other liquids can be rapidly heated to as much as 2,210° F., (1,210° C.), the heat sustained during use, and produce a thermal vapor in the particulate size range of 0.5 micron which induces a venturi effect to accomplish the result of treating the entire colony as noted above.

With respect to uniqueness, it is noted that the Environmental Protection Agency approves the process and chemical formula, and that no other use pattern or label (formula) is or has been approved or licensed for Imported Fire Ant control and eradication by the use of a sub-surface, thermal vapor, nor is there any label existing for the use of any pyrethroid or combination of pyrethroid and synergists for sub-surface use.

The apparatus includes means to carry, by humans or machines, quantities of liquids and gases, which liquids may be pressurized and which may then be heated or converted to vapor or to a gaseous state, and which may be injected directly into the depths of the Imported Fire Ant colony to be spread completely throughout the myriad, interconnecting passages. The liquids are carried in a tank or other suitable container and are fed through a coil to a long, hollow dispensing rod, by means of which the hot liquids, vapors, or gases are delivered into the Imported Fire Ant nest. The heating and conversion from liquid to vapor or gas is accomplished by applying flame to a coil which is contained in a vaporizing chamber, which is located between the storage/supply tanks and the application tube. Various insecticides may be introduced into the liquid at its storage source as conditions warrant their use.

The method or process of delivering the vapors or gases produced by the above-described apparatus is that the lance or vapor tube is rapidly inserted deep into the Imported Fire Ant colony. Upon reaching the depth of maximum insertion, withdrawal is commenced while simultaneously releasing the thermal vapors or gases into the colony by depressing the trigger mechanism of the above described apparatus. As the tip of the lance is withdrawn to the surface of the colony, a strong vacuum effect is produced by the pressure/temperature differential between the heated vapors being injected and the ambient air supply contained within the colony thus permitting an almost instantaneous, total infusion of the entire colony by the vapors or gases which contain an insecticide that is lethal to the Imported Fire Ant.

Another step in the process of eradication of the Imported Fire Ant colony is to continue injecting the vapors or gases until the entire colony is filled to capacity and the excess vapors flow out onto the surface of the colony. Since the vapors or gases are heavier than air, they will flow over the surface of the colony and the nearby area, thus killing all of those ants attempting to escape on the outside of the colony.

An additional part of the process is that the formulation used has a long lasting residual effect that upon recondensing within the colony provides a lethal barrier to reoccupation by those colony members that were not present during the injection. This lethal contamination remains viable for as long as one year after the injection, however another unique feature of this invention's formula is that the insecticide undergoes photodecomposition into harmless compounds within two hours of exposure to sunlight.

The preferred chemicals of this invention and process are of the family of insecticides known as pyrethroids which are classed as axonic poisons. In reference to the Imported Fire Ant, the mode of action of pyrethroids is such that total paralysis is caused within some fifteen (15) seconds of contact with the vapor, and thus the entire colony is effectively eliminated in less than one minute.

The preferred active ingredient chemical of this invention is resmethrin, [5-(phenylmethyl)-3-furanyl]-methyl 2,2-dimethyl-3-(2-methyl-1-propenyl)cyclopropanecarboxylate, as approved by the American National Standards Insitute on Nov. 21, 1978. Resmethrin is a second generation pyrethroid which is approximately twenty (20) times more effective than pyrethrum, but is a relatively innoxious chemical with an Acute Oral $LD_{50}$ of 4,420 mg./kg. There are currently twenty (20) compounds of pyrethroids in the family, all of which are acceptable chemicals for the purposes of this invention. These family members are (1) allethrin, (2) barthrin, (3) bioresmethrin, (4) biopermethrin, (5) cismethrin, (6) cyclethrin, (7) cypermethrin, (8) decamethrin, (9) deltamethrin, (10) dimethrin, (11) fenothrin, (12) fenpropanate, (13) fenvalerate, (14) fluvalinate, (15) furethrin, (16) indothrin, (17) permethrin, (18) phtalthrin, (19) resmethrin, and (20) tetramethrin.

Any liquid insecticide may be incorporated into the embodiment of this invention with the only limitations being of a legal nature regulated by the Environmental Protection Agency of the United States government.

The preferred solvent used as a diluent in this invention is an aromatic solvent of the $C_9$–$C_{12}$ alkyl benzene group. However, all aromatic solvents, aliphatic solvents, and plant derived oils are acceptable for use in this invention. Synergists and other insecticides may be incorporated into the formula of this invention also. Another object of this invention is to include herbicical uses as either a cold aerosol or a thermal vapor using properly identified and licensed herbicides. Additionally, the invention is fully capable of effective use as either an open air or closed space fumigating, fogging, or spraying device for the control of any organism designated as a pest, such pests include all member of the Orders of Siphonaptera, Diptera, Hymenoptera, Stretsiptera, Coleoptera, Lepidoptera, and all orders of a lower classification.

BRIEF DESCRIPTION OF THE DRAWINGS

The foregoing objects are accomplished by a method and apparatus as illustrated in the attached drawings where like reference numerals are applied to like elements and wherein:

FIG. 1 is a pictorial view of apparatus according to the present invention being used in the treatment of Imported Fire Ant infestation;

FIG. 2 is a partial cross-sectional view taken through the apparatus of FIG. 1;

FIG. 3 is an enlarged cross-sectional view taken through the heater assembly of the apparatus of FIG. 1;

FIG. 4 is an enlarged view of the injection tip according to the present invention;

FIG. 5 is an elevational view of a portable carrying assembly for the supply tanks; and FIG. 6 is an elevational view of a back pack type supply tank transportation device.

DESCRIPTION OF THE PRFERRED EMBODIMENT

With reference to FIG. 1, apparatus is shown which is suitable for practicing the method of the present invention. The apparatus includes a lance assembly 10 with a handle assembly 16 which has a first connection 12 that is connected with a suitable storage container 100 (see FIG. 6) for a treating solution. The storage container for the treating solution is provided with a pressurization means, such as compressed gas, in order to maintain the treating solution under pressure propelling it toward the connection 12 with the handle assembly.

The handle 16 (see FIG. 1) of the lance assembly 10 also has a second connection 14 for attachment to a suitable conventional source of pressurized hydrocarbon fuel (not shown). For example, propane in convenient canister sizes is a suitable fuel for the lance assembly 10. When propane is used in the form of a consumer size bottle, the bottle can be attached directly to the second connection 14.

Extending laterally from one side of the handle assembly 16 is a pistol-grip handle 18. The pistol-grip handle 18 provides a convenient grasping place for the operator of the lance assembly 10. Preferably, the handle assembly 16 is fabricated from molded fiberglass. To provide further manual control for manipulation of the lance assembly 10, a second handle 20 projects laterally from the lance assembly 10 at a position spaced longitudinally from the pistol-grip handle 18. The second handle 20 is illustrated at an angle of about 90° relative to the pistol-grip handle 18; however, the second handle 20 can be moved to other preferred positions at the convenience of the user.

Extending to one side of the handle assembly 16 opposite from the pistol grip handle 18, there is a vaporizing chamber 28. This vaporizing chamber 28 provides a means for vaporizing the treating solution so that hot vapor can be injected into an Imported Fire Ant colony, next, or mound 22. The vaporizing chamber 28 is specifically sized to allow a pressurized fluid of any temperature, viscosity, molecular weight, or chemical composition to be heated to and beyond the point of vaporization.

Extending longitudinally forwardly from the handle assembly 16 is a lance 24 which terminates in a lance point 26.

The handle assembly 16 provides adequate support for the entire lance assembly and provides a means for forcing injection of the lance tip 26 into a substrate. In addition, the handle assembly 16 contains the necessary valving, manifolding, and conduits to bring pressurized treating solution from the storage tank into heat transfer relationship with the hydrocarbon fuel. More particularly (see FIG. 2), the first connection means 12 attaches a fluid line from the treatment fluid storage tank to a first control valve 30 located in the pistol-grip portion 18 of the handle assembly 16. This first control valve has a trigger actuator 32 which can be controlled by an operator's fingers. When the trigger actuator 32 is depressed, fluid communication is established through the first control valve 30 between the treatment solution supply line 34 and a supply conduit 36. The first control valve may be a commercial valve and trigger assembly manufactured such as those supplied by Milton Manufacturing Co., Inc. of Chicago, Ill.

Between the first control valve 30 and the supply conduit 36 there is an inline check valve means 35 for allowing treatment solution to advance to the vaporizing chamber and for containing treatment solution from passing back to the first control valve. This inline check valve allows treatment solution to pass through with a driving pressure as low as 3 psi. However, the inline check valve 35 resists and contains flow backwards toward the first control valve 30 for driving pressures as high as 3,000 psi.

The supply conduit 36 provides fluid communication for the treatment solution between the inline check valve to which it is connected at one end and an inline orifice 37 connected to its other end. The inline orifice 37 is connected, in turn, to a treatment solution manifold 38. The orifice 37 has small diameter passage therethrough which is selected to atomize the treatment solution thereby breaking it into small, aerosol size droplets as the treatment solution flows through the inline orifice enroute to the treatment solution manifold 38.

The manifold 38 provides a means for accepting or receiving the atomized droplets from the inline orifice 37 and for transferring those droplets to the vaporizing chamber 28. In addition, the manifold 38 provides a means for receiving heated vapor and a liquid from the vaporizing chamber 28 and conveying those fluids to the inner barrel or central conduit of the lance assembly. The manifold 38 is preferably fabricated from "304" stainless steel bar stock which is suitably drilled, tapped, and threaded to provide a single unit that interconnects the incoming, pressurized fluid, the outgoing, heated vapor, and the central conduit of the lance assembly. In addition, one end of the manifold may be threaded to receive the outer barrel of the lance assembly.

At one end, the manifold 38 establishes fluid communication for atomized treatment solution between the supply conduit 36 with the inline orifice 37 and a heater supply conduit 40. At its second end, the manifold 38 establishes fluid communication for the hot vaporized treatment solution between a heater return conduit 42 and a central conduit 44 of the lance 24. The conduits 40, 42 are preferably fabricated from stainless steel. It should be noted that no fluid communication is possible between the two ends of the manifold 38 without passing through the vaporizing chamber 28 which is external thereto. Moreover, it should be noted that the external tube of the lance 24 is coaxial with the central conduit 44 and is also attached to the manifold 38.

The handle assembly 16 also includes a second control valve 46 which is located at one end of the handle assembly 16 remote from the lance 24. The second control valve 46 includes a control knob 48 which regulates communication of fuel between the second connection means 14 and a burner fuel conduit 50 that extends from the second control valve 46 to the vaporizing chamber 28 and which terminates in a burner tip 52. This burner tip 52 discharges directly into the vaporizing chamber 28 to heat the atomized treatment solution. The second control valve 46 the burner fuel conduit 50 and the burner tip 52 may be purchased as a single item. For example, a piezo-electric, T-500 Professional Model, Propane Torch manufacture by Ignitor Products International, Inc. trademarked as Surefire, may be directly incorporated into the sytem to provide the function of these parts.

The vaporizing chamber 28 (see FIG. 3) is generally cylindrical in shape and includes an exterior surface which may be fabricated from bright finish stainless steel. The external cylindrical wall functions as an outer cover for the entire vaporizing chamber, the top being vented to provide a means for venting or allowing the escape of hot chamber gases.

The vaporizing chamber also has means for exposing the atomized treatment solution to heat which includes a tubing coil having a pair of tubular coils 54, 56 which are coaxially mounted in a central cylindrical chamber 58. Each of the tubular coils 54, 56 is preferably fabricated from ¼ inch "304" stainless steel, seamless tubing, 16 feet long. The tubing may be wrapped to a coil diameter of ⅞ inches for the outer tubular coil 56 and to a coil diameter of 2¼ inches for the inner coil 54. The overall length of the coils is on the order of 3 inches.

The central cylindrical chamber 58 is defined in part by a generally circular upper wall 60, a generally cylindrical insert or shielding baffle 62, and a generally circular lower wall 64. The upper wall 60 is spaced from the outside wall such that insulation material 66 can be contained therebetween. Similarly, the lower wall 64 is spaced from the bottom of the vaporizing chamber such that insulation material 68 can be contained therebetween.

The cylindrical insert is preferably a steel tube fitted to close tolerance that fits over the coils 54, 56 to allow the wrapping of insulating material around the coils and mantle to contain the heat inside the coils and prevent direct contact between that insulating material and the coils. The outer wall is sized to allow a space between the cylindrical insert and the outer wall of about ½ inch.

The annular space defined between the cylindrical outer wall of the vaporizing chamber 28 and the cylindrical insert 62 is partially filled with heat resistant spun fiberglass insulating material 70. The insulating material 70 is proportioned and positioned so that fluid communication can occur between the chamber 58 and the exterior of the vaporizing chamber 28. To this end, the cylindrical insert 62 is provided with a plurality of openings 72 adjacent to the upper end thereof while the exterior wall of the vaporizing chamber 28 is provided with a plurality of elongated slots 74.

To provide a means for inspection and for access to the interior of the vaporizing chamber 28, a suitable threaded connection 65 can be made between two portions of the external cylindrical wall.

The burner supply tube 40 and the burner return tube 42 each extend through the insulation 68, the circular wall 64, and enter the central chamber 68. The burner supply tube 40 is connected to one end of the outer helix of the tubular coil 54. In similar fashion, the corresponding end of the inner helix of the tubular coil 56 is attached to the heater return tube 42. The opposite ends of the two tubular coils 54, 56 are connected in fluid communication relationship. With this relationship, the cool treatment solution which first enters the vaporizing chamber 24 is heated by the relatively cooler gases which have already passed through the inner coil 56 but which are still hot compared to the fluid being heated. Subsequently, the treatment solution passes into the inner coil 56 and advances toward the burner tip 52. In other words, the treatment solution encounters increasing temperatures as it progresses through the combination of the two tubular coils 54, 56.

So that the flame from the burner tip 52 does not create hot spots on the tubular coils 54, 56 and is spread to enable a substantially equal distribution of heat over the entire surface of the inner coil, a mantle 76 is coaxially disposed in the central chamber 58. The mantle 76 extends longitudinally as far as the length of the tubular coils 54, 56. The mantle is preferably fabricated from 10 by 60 stainless steel wire mesh and is about 3¼ inche long by a ⅝ inch diameter. The upper circular wall 64 is stainless steel and encloses the proximal end to act as a flame reflector. In addition, the circular wall 60 operates to reflect some of the flame back to the tubular coils.

Part of the vaporizing chamber comprises a cap provided on the distal end of the mantle. The cap is threaded 65 specifically to connect to the flame tube end of the vaporizing chamber.

The function of the mantle is to spread the flame from the torch to provide equal distribution of the heat over all the coils and thus eliminate "hot spots" in the chamber. It further provides equal heat throughout the entire chamber which allows a continuous high chamber temperature in excess of 2,000° F. (1,093° C.) and thus provides "flash" vaporization of the atomized treatment solution.

Accordingly, as treatment solution passes through the vaporizing chamber, it is heated to a sufficiently high temperature to vaporize it. The vapor is then delivered through the coaxial conduit of the lance 24 (FIG. 1) to the injection tip. At the end of the central conduit, within the injection tip 26, there is a second orifice which regulates the discharge of vapor from the lance. The second orifice can be enlarged to reduce the pressure at which the vapor is exhausted; conversely, the orifice can be replaced with a smaller orifice thereby increasing the pressure at which vapor is exhausted. The second orifice also serves to regulate the residence time of the atomized treatment solution in the vaporizing chamber so that it is fully vaporized. In addition, the second orifice gives rise to a venturi effect at the point of injection.

The lance 24 is a tube-within-a-tube arrangement. The outer tube is preferably fabricated of ¾ inch "304" stainless steel for strength and rigidity. The inner coaxial, or vapor tube, is preferably fabricated from ⅛ inch seamless, "304" stainless steel. The air space between the two tubes acts as a "dead air" insulator wherein the inner tube maintains a temperature high enough to keep the vapor in a high state of excitation while allowing the outer tube to remain more than 1,000° F. cooler. The discharge (distal) end of the central vapor tube is threaded and has a fixed diameter orifice of, for example, 0.1094 inches which provides a constant back pressure on the vapor from the heating coils.

By decreasing the orifice size, internal pressures are increased and thus produce a more forceful jet effect at explusion. By removing the orifice or increasing its diameter, the back pressure on the heating coils is reduced and a more gentle flow and a greater volume of vapor are permitted to discharge. This adjustment of orifice size permits variation of injection pressures and volumes as required by various soil conditions and soil moisture content. The orifice plug iself is preferably made of a metal with less tensile strength than the central vapor tube thus acting as a blowout plug for safety in the event the opening becomes plugged.

The injection tip 26 is mounted on the external tube of the lance 24. It should be noted at this time that an annular air space defined between the central tube and the external tube which operates to reduce the temperature of the external tube during operation reduces risk of burns to the operator.

Preferably, the injection tip 26 (FIG. 4) has three circumferentially spaced flutes 80 which coalesce at a common point 82. A conical projection 86 is coaxially aligned with the orifice 84 and operates to deflect discharging vapor laterally around the point portion 82. With this arrangement, the point portion 82 shield the orifice 84 from being clogged by material from the colony, nest, or mound being penetrated for treatment.

The injection tip is fabricated from "304" stainless steel. The triangular spear point with the three tapered flutes, or cutting edges 80, provides for ease of penetration into any substrate, with exact distance between the end of the vapor tube orifice and the internal end plate of the tip being operable to provide a 360° dispersal of the vapor as it reflects back from the internal end plate. The threee guides, or cutting edges are specifically arranged so that the space between them allows an uninterrupted cloud of vapor to escape, while providing a quick clean feature in the event of clogging, and permitting access to the vapor tube orifice without removing the spear point.

The injection point 26 may also be provided with a built in wrench channel 88 to enable it to be put on or take off witout the possibility of the wrench slipping and marring the surface of the tip 26. The integral wrench channel 88 also provides a very large mechanical advantage for torque used to tighten or to remove the point 26.

The butt end of the injection tip 26 is slightly larger in diameter than the diameter of the lance shaft, providing an injection hole with a larger diameter than the lance which, in turn, provides an easy insertion and withdrawal.

Turning now to FIG. 5, portable assembly is shown which makes the system transportable as a back-pack. A first container or tank 100 is provided for the treatment solution. At the top, this first tank 100 has a cap assembly 102 which contains means for delivering treatment solution to the supply conduit 34 as well as means 104 for pressurizing the first container. The delivery means may, for example, comprise a tube extending from the cap assembly 102 to the bottom of the tank 100 and communicating with the supply conduit 34. The pressurizing means 104 may, for example, comprise a regulating valve which communicates through the cap assembly 102 to a space at the top of the first tank 100.

To provide a source of pressure for the first tank, a seconde or pressure tank 106 can be provided. Preferably this second tank contains a compressed gas. The pressure tank 106 has a control valve 108 which can be opened to connect the pressure source or which can be closed to isolate the pressure source from the first tank 100. Pressurized gas from the pressure tank 100 passes through a regulator valve assembly 110 which is adjustable to establish the maximum pressure to be delivered to the first tank 100. A suitable hose 112 may be used to provide the necessary communication between the regulator valve assembly 110 and the control valve 104 on the first tank 100.

If desired, suitable conventional quick release couplings 114, 116 can be used to effect the connections between the hose 112 and the valve 104, and between the supply conduit 34 and the first control valve 30.

For transportability, the first tank 100 and the pressure tank 106 can be attached to a frame 120 that can be carried as a back pack.

An alternate embodiment which allows transportability of the tanks is illustrated in FIG. 6. In this embodiment the treatment solution tank 100 is about the same size as the pressurization tank 106. Basically, the same valving and connection arrangements are used. The tanks are held in a caddy 120 having a T-shaped handle for ease of transportation.

OPERATION

In operation, the treatment solution is prepared for use in Imported Fire Ant extermination. The active ingredient preferred for the radial insecticide is a pyrethroid. Pyrethroids are synthetic compounds produced to duplicate or improve more or less successfully on the biological activity of the active principles of the pyrethrum plant. These compounds include: allethrin, alphametrin, barthrin, bioresmethrin, biopermethrin, cismethrim, cyclethrin, cyfluthrin, cypermethrin, decamethrin, deltamethrin, dimethrin, fenothrin, fenpropanate, fenvalverate, flucythrinate, fluvalinate, furethrin, indothrin, permethrin, phthalthrin, resmethrin, tetramethrin.

Pyrethroids are preferred in contrast to Pyrethrum. Pyrethrum is a pyrethrin which is a botanically derived substance. Pyrethrum does not kill quickly—it quickly paralyzes the insect which then dies slowly from other causes. Pyrethrum does not have residual properties, e.g., pyrethrins are oxidized on exposure to the air and stored flowers may lose significant fractions of their activity in a year. Pyrethroids, however, are man-made, synthetic materials that have proven to be stable for long periods of time in water based aerosols.

The preferred pyrethroid for use in the present invention is resmethrin. The molecular structure of resmethrin is illustrated below:

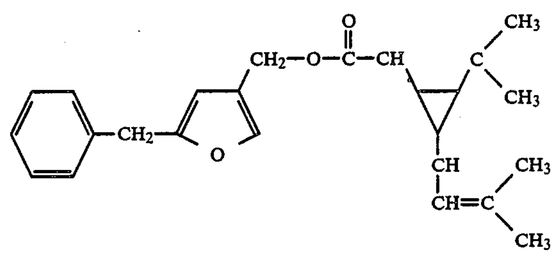

Resmethrin is an axonic poison. The axon of a nerve cell is an elongated extension of the cell body. Resmethrin affects both the peripheral and the central nervous system of the insect. Pyrethroids have a greater insecticidal effect when the temperature is lowered; i.e., they have a negative temperature coefficient. Thus, as the insecticide cools, its efficacy actually increases. Pyrethroids initially stimulate nerve cells to produce repetitive discharges and eventually cause paralysis.

It is also noted that it has been found that when eggs, larvae, and pupae of ants are covered with a hydrocarbon film, those eggs, larvae, and pupae are smothered and die.

A preferred solvent used as a diluent in the present invention is an aromatic solvent of the $C_9$–$C_{12}$ alkyl benzene group. However, all aromatic solvents, aliphatic solvents, and plant derived oils are acceptable for use in this invention.

With the foregoing principles in mind, a treatment solution can be prepared with the following composition:

| | |
|---|---|
| Active ingredients: [5-(phenylmethyl)-3-furanyl] methyl 2,2-dimethyl-3-(2-methyl-1-propeynl) cyclopropane-carboxylate | 1.00% |
| Inert ingredients: | 99.00% |
| | 100.00% |

The inert ingredients in the above composition include petroleum solvents. The treatment solution above is equivalent to 0.0835 pounds of resmethrin per gallon or 10 grams per liter of resmethrin disolved in the petroleum solvent.

While the proportions set forth above represent a preferred treatment solution, the resmethrin component may be selected in the range of about 0.20% to about 40.00% with the balance being inert ingredients including petroleum solvents.

Moreover, the desired insecticide may be selected from the group consisting of the known pyrethroids, an organochlorine, a cyclodiene, a polychloroterpene, an organophosphate, an aliphatic derivative, a phenyl derivative, an heterocyclic derivative, an organosulfur, a carbamate, a formamidine, a thiocyanate, a dinitrophenol, nicotine, rotenone, sabadilla, and ryania. Synergists or activators for the foregoing compounds can also be used in conjunction therewith.

Before treatment of the mound, nest or colony begins, the perimeters of the mound, nest or colony will usually be determined. In this fashion, the amount of pesticide to be injected can be predetermined. In a similar vein, the area to be treated is surveyed to establish the infestation rate.

The treatment solution is then prepared. The treatment solution is first placed in the insecticide storage tank or container 100 (see FIG. 6). The treatment tank is then sealed, after which it is pressurized by a gas charge. For example, the valve 108 on the pressure tank 106 can be opened allowing pressurized gas to flow through the regulator valve assembly 110 to the control valve 104 on the cap assembly 102 of the insecticide storage tank 100. Alternatively, a manual pump, or any other suitable conventional means may be used to pressurize the treatment tank 100. From the insecticide storage tank, the treatment solution is delivered or transferred through the liquid line 34 to the first fluid connection 12 (FIG. 1) on the pistol-grip portion 18 of the handle assembly 16. Further flow of the treatment liquid is regulated and controlled by the first control valve 30 (FIG. 2).

To further prepare for treatment of an Imported Fire Ant colony, nest or mound, the vaporizing chamber 28 is preheated. To accomplish this, a suitable fuel, such as propane, is introduced to the second connection 14 on the handle assembly 16. By properly adjusting the knob 48 to allow propane flow, and igniting the propane at the burner tip 52 with the piezo-electric ignitor 51, the central chamber 58 (FIG. 3) of the vaporizing chamber 28 is raised to its operating temperature.

During this preheating step, flame from the burner tip 52 engages the mesh of the mantle 76 (FIG. 3) so as to uniformly heat the inner tubular coil 56. The outer tubular coil 54 is also heated at this time but, since the outer coil 54 is partially shielded from the flame by the inner coil 56, the outer coil may not be raised to precisely the same temperature as the inner coil.

When the vaporizing chamber has been sufficiently preheated, the lance assembly 10 (FIG. 1) is ready to treat a mound 22. At this time, holding the lance assembly 10 by the pistol-grip portion 18 and the secondary handle portion 20, the tip 26 of the lance assembly 10 is thrust into the mound 22.

As the point 82 (FIG. 4) of the tip enters the mound, the three flutes cut through the substrate while protecting the orifice 84 from plugging. In addition, the enlarged base portion of the tip 26 provides an enlarged opening through which the concentric tubes of the lance assembly also penetrate the mound.

Treatment of the mound 22 (FIG. 1) can commence as soon as the tip 26 penetrates the mound surface. If it commences immediately, some surface spray treatment will occur. To accomplish the treatment, the trigger 32 is depressed toward the pistol-grip portion 18 of the handle. As the trigger 32 (FIG. 2) is depressed, the pressurized treatment solution from the supply tank passes through the first fluid control valve 30, the inline check valve 35, the conduit 36, and the inline orifice 37. The treatment solution is atomized as it passes through the orifice 37. Atomized treatment solution passes through the manifold 38, and the heater supply conduit 40 as it is tranferred to the vaporizing chamber 28.

As the atomized treatment solution passes through the vaporizing chamber 28, it passes through the outer tubular coil 54 (FIG. 3) generally in cocurrent relationship to the flame and combustion products from the burner tip 52. Then the treatment solution passes through the inner tubular coil 56 in general countercurrent relationship to the flame and combustion products from the burner tip 52. As the treatment solution traverses these two tubular coils, it is completely vaporized and is heated to a temperature which can approach 2,210° F. (1,120° C.)

Hot, vaporized treatment solution leaves the vaporizing chamber 28 and is tranferred to the mound by passing through the conduit 42, and returning to the manifold block 38 (FIG. 2) where it is placed in fluid communication with the central conduit 44 of the lance 24. The orifice in the injection point creates a predetermined back pressure on the operation of the vaporizing chamber 28. Accordingly, as the treatment solution continues to enter the vaporizing chamber and be vaporized, the resulting thermal vapor is expelled from the orifice to treat the Imported Fire Ants in the mound.

Because of the speed with which the treatment solution is vaporized and released from the orifice in the tip, the pyrethroid, resmethrin in this case, completely fills the tunnels, chambers, passages, and available pore space of the mound in a very brief period of time, on the order of seconds. When the trigger is depressed during the insertion of withdrawal process, a free flow injection of the mound results. If desired, however, the lance tip can be thrust deeply into the mound before the trigger is depressed. This results in a deep injection. Moreover, if the trigger is depressed continuously after the tip is thrust deep into the mound, and is held down while the lance remains at a deep position in the mound, during withdrawal of the lance, and when the tip broaches the mound surface, free flow injection, deep injection and surface spray can be simultaneously accomplished. With surface spray, since the vapor is heavier than air, the vapor flows over the surface of the colony and the adjacent area killing those ants attempting to escape from the outside of the mound.

When the tip of the lance reaches the surface of the mound, a strong vacuum effect is produced by the pressure/temperature differential between the heated vapor being injected and the ambient air supply in the colony. This results an almost instantaneous, total infusion of the entire colony by the vapor containing the insecticide.

Furthermore, it will be seen that there is no need to disturb the internal structure of the colony, nest, or mound as the treatment is effected.

As a result of the treatment process, the pyrethroid immediately attacks the central and peripheral nervous systems of the insects paralyzing them and killing them before the ants have an opportunity to evacuate the nest through the escape tunnels. Moreover, the vaporized hydrocarbon fraction of the treatment solution as well as the pyrethroid condense on the internal surfaces of the nest to provide residual insecticide action to render the nest unsuited for further habitation by the ants. The hydrocarbon fraction also condenses on the eggs, larvae, and pupae which remain in the nest and smothers them so that the eggs, larvae, and pupae are killed also.

The residual pyrethroid which remains in the nest photodegrades on exposure to the ultraviolet radiation of natural sunlight. Accordingly, as the nest is subsequently exposed to the sun, the residual pyrethroid photodegrades to harmless substances.

Thus the system enables the operator to deliver into the entire nest cavity a killing thermal vapor that bypasses the nest barriers against liquids such as liquid "locks" and "s" configuration tunnels, and at such a rate that the inhabitants are not able to outrun the killing vapor to the escape tunnels.

The usefulness of the foregoing described apparatus and process is evidenced by the fact that it is: (a) species specific, (b) has no deleterious after effects to the area, (c) can be applied to producing crop lands equally with fallow pasture lands, (d) destroys all of the eggs of a colony along with the adults, juveniles, and all larval stages. Accordingly, reinfestation by hatching and/or metamorphosis is eliminated; and (e) most importantly, kills all the gravid queens before they can escape to reestablish. Thus, a one time use control agent and process results.

The preferred insecticide of the present invention is not limited to sub-surface use.

The invention can be used as an open air or closed space fumigating, fogging, or spraying device for the control of any organism designated as a pest. Such pests include all members of the Orders of Siphonaptera, Diptera, Hymenoptera, Strepsiptera, Coleoptera, Lepioptera, and all orders of a lower classification.

It should now be apparent that the present invention provides a method for eradicating the Imported Fire Ants from infested areas. Moreover, it should now be apparent that a suitable device has been disclosed to practice the method. Those skilled in the art will also appreciate that numerous modifications, variations, substitutions, and equivalents exist for various features of the method and apparatus which do not materially depart from the scope of the invention. Accordingly, it is expressly intended that all such modifications, variations, substitutions, and equivalents which fall within the spirit and scope of the appended claims be embraced thereby.

What is claimed is:

1. A method of treatment of areas infested with Imported Fire Ants of the Genus Solenopsis comprising the steps of:
   preparing a treatment solution including a pyrethroid as the active ingredient;
   preheating a heater portion of an injection lance assembly;
   inserting a tip of the lance assembly into a Solenopsis infested mound;
   delivering the treatment solution to a heater portion of an injection lance assembly;
   vaporizing this solution in the heater portion of the injection lance assembly with temperatures sufficient to vaporize all constituents of the solution and ranging up to 2,210° F. (1,210° C.);
   regulating release of the vaporized solution from the injection lance assembly with a restricting orifice so that the vaporized solution builds up pressure in the lance assembly;
   releasing the vaporized solution under pressure from the end of the lance in a time interval of no more than ten seconds such that the vaporized solution kills ants before they can evacuate the colony and condenses on internal surfaces of the mound to provide lasting protection against regeneration and rehabitation of the mound.

2. The method of claim 1 wherein the releasing step includes discharging the vaporized solution with droplets having sizes in the range of one-half of a micron.

3. The method of claim 1 including the step of using resmethrin as the pyrethroid in the solution.

4. The method of claim 1 including the step of using a pyrethroid which biodegrades upon exposure to sunlight so that the treatment method can be used in crop fields.

5. A method for eradication of the Imported Fire Ant of the Genus Solenopsis comprising the steps of:
preparing a mixture of chemicals comprised of a solvent and an insecticide that will vaporize into submicron particles when heated to an adequate temperature;
placing said mixture into a pressurizable holding container having a means of pressurizing, a means for sealing the container, a means for controlling the pressure, a means for releasing the pressure, and a means to transfer the mixture from the container;
transferring said mixture from the holding container to a vaporizing chamber;
heating the mixture to temperatures as high as 2,210° F.;
transferring the vapor produced in the previous step into a colony, nest, or mound of the target insects;
releasing the vapor in a controlled amount and with a controlled pressure adequate to rapidly and completely infuse the colony, nest, or mound including its entire chamber and all available pore space completely filling it with the insecticide carrying vapor totally replacing the entire ambient air supply of the colony, nest, or mound;
introducing adequate amount of vapor to effect an immediate kill of all insects contained within the colony, nest or mound and further provide a long lasting, killing residue; and
introducing the vapor in an injecting step that causes a venturi effect which, in turn, produces a vacuum effect allowing the vapor to be drawn into the colony, nest, or mound without the use of forced pressure injection.

6. The method of claim 5 including preparation of a mixture of chemicals comprising diluents, emulsifiers, synergists, aromatic hydrocarbon or aliphatic hydrocarbons added to an insecticide, pesticide, or herbicide to produce an end use product for the purpose of being vaporized to be used as a pesticide.

7. The method of claim 5 including the step of introducing the vapor into the colony, nest, or mound as a free flow injection, a deep injection, and a surface spray, without disturbing the interal structure of the colony, nest, or mound or disturbing the structure of the nest, colony, or mound.

8. The method of claim 5 including delineating the perimeters of the colony, nest, or mound in order that a calculated amount of pesticide be injected.

9. The method of claim 5 including the steps of surveying the specific area to be treated and establishing an infestation rate in order that sufficient amounts of vapors be introduced.

10. The method of claim 5 wherein the mixture includes a pyrethroid, [5-(phenylmethyl)-3-furanyl]-methyl 2,2-dimethyl-3-dimethyl-3-(2-methyl-1-propenyl) cyclopropanecarboxylate.

11. The method of claim 5 wherein the pyrethroid is mixed at a rate of 1% w/w or as 0.0835 pounds of resmethrin per gallon or 10 grams of resmethrin per liter as the preferred insecticide.

12. The method of claim 5 wherein the amount of the pyrethroid is mixed in the range of from about 0.20% w/w to about 40.00% w/w.

13. The method of claim 5 wherein the insecticide may be selected from the group consisting of known pyrethroids, an organochlorine, a cyclodiene, a polychloroterpene, an organophosphate, an aliphatic derivative, a phenyl derivative, an heterocyclic derivative, an organosulfur, a carbamate, a formamidine, a thiocyanate, a dinitriphenol, nicotine, rotenone, sabadilla, and ryania, and may include synergists or activators for any or all of the above.

14. An apparatus for eradicating Imported Fire Ants of the Genus Solenopsis comprising:
an insecticide container for holding an insecticide and a solvent;
havig a cap assembly to contain the pressure and the fluid in the container;
means to regulate the pressure in the container;
means to provide pressurizing gases to the container;
means for pressurizing the insecticide container and expelling the insecticide and the solvent from the insecticide container;
including a container for pressurizing gas;
means to interconnect the pressurizing chamber and the insecticide container containing the insecticide;
portable means for carrying the insecticide container and the pressurization container;
an injector assembly;
means for connecting the injector assembly to the insecticide container having the insecticide; the injector assembly including:
a trigger assembly with a means for releasing the insecticide and solvent from the insecticide container;
a one way valve assembly communicating with the trigger assembly that allows flow of liquid from the container and the trigger assembly into a manifold assembly which allows for a one-way flow at an activation rate of three (3) psi, but with a reverse flow pressure containment of 3,000 psi;
a manifold of such design and dimensions to provide the means for accepting the aerosol droplets and/or liquid for transfer;
an in-line orifice with means to break up the flow of the liquids into small, aerosol size droplets prior to entering the manifold;
a vaporizing chamber having a double coil of tubing connected to the manifold, a mantle which acts as a flame spreader; a shielding baffle surrounding the flame spreader, sufficient insulation to contain the heat within the chamber, a stainless steel cover with means for attachment to a heat source, means for venting hot gases, and means to provide access to the inner portions of the vaporizing chamber;
the mantle provides for the spreading of a flame source enabling an equal distribution of heat over the entire surface of the inner coil of the vaporizing chamber with a means including an end cap for reflecting the flame from the burner source back into the chamber and being of such material as to withstand ambient, sustained temperatures in excess of 2,200° F.;

an ignitor and torch assembly connected to the vaporizing chamber to provide a flame source, and having a means for accepting an external fuel source;

a molded handle assembly with means to enclose the trigger assembly, the one way valve, the in-line orifice, and the manifold, configured to provide adequate support for the entire assembly and to provide a means for forced injection of the lance tip into a substrate;

a lance assembly having inner and outer barrels;

a coupling arrangement with means for joining the manifold to the inner and outer barrels of the lance assembly;

the means of accepting the heated vapor from the vaporizing chamber with a means of conveying this vapor into an inner barrel of the lance assembly;

the inner barrel for the transport of vapor from the manifold assembly to the lance tip assembly with means for attachment to the manifold and with means for containing an orifice that restricts the flow of the vapor from the manifold and creates a back pressure to the vaporizing chamber which enables the liquid insecticide and solvent to remain within the vaporizing chamber for an adequate time to attain temperatures that will permit the input of energy that will cause the particles of the vapor to be dispersed to sub-micron size and further for the orifice to cause a pressure differential at the point of release thus giving rise to a venturi effect at the point of injection;

the outer barrel providing structural integrity and a means for insertion into the substrate and with a means for attachment to the manifold, a means for attachment of a lance tip, and a means for attaching a movable fore-grip handle;

an annular air space defined between the inner and the outer barrels to provide an insulating cushion of air between the hot inner barrel and the cold outer barrel;

a lance tip assembly comprising three circumferentially spaced flutes which coalesce at a common point with a conical projection that is coaxially aligned with the orifice of the inner tube to deflect discharging vapor laterally around the point of insertion and with a means for shielding the orifice, a means for attachment to the outer barrel, a means for providing a built-in wrench channel, and a means to provide access to the inner barrel orifice for cleaning or removal without disassembly of the lance tip; and a fore-grip assembly with means for attachment to the outer barrel of the lance assembly by means of a slide assembly and containing a quick-release locking assembly to allow positioning along and around the barrel at the user's discretion.

* * * * *